(12) United States Patent
Peterson et al.

(10) Patent No.: US 7,044,851 B2
(45) Date of Patent: May 16, 2006

(54) AIR HANDLING SYSTEM FOR SPECIALIZED FACILITY

(75) Inventors: Michael J. Peterson, Nashville, TN (US); Mark Vesligaj Jagotrab, Nashville, TN (US)

(73) Assignee: Dialysis Systems, Inc., Nashville, TN (US)

(*) Notice: Subject to any disclaimer, the term of this patent is extended or adjusted under 35 U.S.C. 154(b) by 0 days.

(21) Appl. No.: 10/351,296

(22) Filed: Jan. 23, 2003

(65) Prior Publication Data
US 2004/0147217 A1    Jul. 29, 2004

(51) Int. Cl.
*F24F 3/16* (2006.01)

(52) U.S. Cl. ............... 454/236; 62/264; 454/187; 454/230

(58) Field of Classification Search ........... 454/230, 454/232, 233, 236, 228, 187; 55/385.2; 62/264, 62/78
See application file for complete search history.

(56) References Cited

U.S. PATENT DOCUMENTS

| | | | | |
|---|---|---|---|---|
| 3,354,946 A | * | 11/1967 | Dean, Jr. ............... | 165/48.1 |
| 3,458,130 A | * | 7/1969 | Juhlin ..................... | 237/53 |
| 4,484,563 A | * | 11/1984 | Fritz et al. ............. | 126/299 D |
| 4,549,472 A | * | 10/1985 | Endo et al. ............. | 454/187 |
| 4,676,144 A | * | 6/1987 | Smith, III ............... | 454/187 |
| 4,781,108 A | | 11/1988 | Nillson | |
| 4,880,581 A | * | 11/1989 | Dastoli et al. .......... | 264/39 |
| 5,086,692 A | | 2/1992 | Welch et al. | |
| 5,453,049 A | * | 9/1995 | Tillman et al. .......... | 454/228 |
| 5,558,158 A | * | 9/1996 | Elmore .................. | 165/122 |
| 6,280,686 B1 | * | 8/2001 | Scheir et al. ........... | 422/24 |

FOREIGN PATENT DOCUMENTS

| | | | | |
|---|---|---|---|---|
| JP | 2-37243 | * | 2/1990 | ............... 454/187 |
| JP | 6-94260 | * | 4/1994 | ............... 454/187 |

OTHER PUBLICATIONS

Brochure, Williams Furnace Company, Colton, California.
Brochure, Amico Corporation, Passaic, New Jersey.
Exhibit A: Photograph of corner ductwork.

* cited by examiner

*Primary Examiner*—Harold Joyce
(74) *Attorney, Agent, or Firm*—Waddey & Patterson, P.C.; Lucian Wayne Beavers

(57) ABSTRACT

An air handling system for a specialized environment, such as an operating room in a hospital or other health care facility is presented. The air handling system includes an air recirculation system having a blower for drawing air from the specialized environment for recirculation; a recirculation diffuser operatively connected to the specialized environment for recirculating air back to the specialized environment by action of the blower; and recirculation ductwork providing a pathway for air traveling from the blower to the recirculation diffuser.

14 Claims, 3 Drawing Sheets

AIR HANDLING SYSTEM FOR SPECIALIZED FACILITY

TECHNICAL FIELD

The present invention relates to an air handling system for a specialized environment. By environment is meant a room or other enclosed space in a facility. More particularly, the invention relates to an air handling system for a special needs environment, such as the operating room of a hospital or other health care facility.

BACKGROUND OF THE INVENTION

In an operating room of a hospital or health care facility or other such specialized environment, air handling needs often differ from other areas of the facility. For instance, in order to reduce the risk of infection or other deleterious result, it is often desirable to have a higher level of air recirculation in an operating room than in other rooms or areas of a hospital. Indeed, there is often the requirement that the air in an operating room be recirculated a certain number of times per hour, and that the air circulated back into the room contain a specific minimum percentage of outside air. There are often filtration requirements for operating room air also. The same can be true of clean rooms in silicon wafer manufacturing and other like areas where the air needs to be more often filtered and treated than in other areas of the same facility.

Conventionally, in order to provide an increase in the air recirculation in such a specialized environment, the air handling system for the entire facility was designed so as to permit the high levels of recirculation needed for the more specialized environments within the facility. As such, the air handling system was designed to be much larger and with a much higher capacity than would normally have been required for a facility of like size. This resulted in a significant decrease in system efficiency and a substantial increase in air handling system cost.

Air handling systems for controlling air flow in an operating room have been proposed in the past. For instance, Nillson, in U.S. Pat. No. 4,781,108, proposes a system for providing clean air to an operating room which includes a central air supply source adapted to direct the air towards the operating table. Likewise, in U.S. Pat. No. 5,086,692, Welch and Bloomfield propose an air handling system for an operating room which is adapted to direct air from a diffuser in a manner which reduces concentrations of air borne bacteria and other particulates.

While the two cited patents each relate to means for directing the airflow within an operating room, neither addresses the problem of providing an increase of the recirculation of air in the operating room without overburdening the facility air handling system.

What is needed therefore, is an air handling system for a specialized environment such as an operating room in a hospital or other health care facility, which can function to increase the circulation of air in the specialized environment without requiring an outsized air handling system.

SUMMARY OF THE INVENTION

It is an object of the present invention to provide an improved air handling system for a specialized environment such as an operating room in a hospital or other health care facility.

It is another object of the present invention to provide such an air handling system which can be disposed within the environment for which specialized air handling needs are desired.

It is yet another object of the present invention to provide an air handling system for a specialized environment which can provide for increased circulation and treatment of the air within that environment without affecting the air circulation in other environments in the facility.

It is still another object of the present invention to provide an air handling system for a specialized environment which requires less space in the environment, compared to a conventional system, in order to accommodate the ductwork, while still providing the same degree of air recirculation for that environment.

These objects and others which will be apparent to the skilled artisan upon reading the following description, can be achieved by providing an air handling system for a specialized environment which comprises an independent air recirculation system consisting of a return, a blower and a diffuser with ductwork therebetween, such that air can be drawn from the environment, preferably through a return air register, by action of the blower and returned to the environment via the diffuser, without having entered the primary air handling system of the facility itself.

Such an independent air handling system preferably also includes a cooling coil and/or heater for adjusting the temperature and/or humidity content of the recirculated air, as well as filters or other air treatment devices for removal of bacteria or other undesirable contaminates and particulates.

The inventive air handling system also preferably includes a second blower for returning air from the environment to the facility air handling system where it can be exhausted and/or mixed with outside air and returned to the environment via a diffuser. The air returned to the environment from the facility air handling system can likewise be heated, cooled, and/or conditioned, as well as subjected to filtering or other treatments.

The specialized environment air handling system of the present invention is advantageously modular such that, if need be, it can be moved to a different environment in the facility; for example, during a renovation in which an operating room in a hospital is to be converted into a different type of room that would require less air recirculation, while a different room in a hospital is to be converted into an operating room. In addition, the modular nature of the supplemental air recirculation system of the present invention is such that it assumes less space than conventional operating room ductwork and thus saves valuable space.

In a preferred embodiment, the inventive air handling system includes a facility air handling system which has an air handler; an air handler diffuser operatively connected to the specialized environment for providing air from the air handler to the specialized environment; an air return register through which air is provided from the specialized environment to the air handler; a first set of air handler ductwork for providing a pathway for air traveling from the specialized environment to the air handler; and a second set of air handler ductwork for providing a pathway for air traveling from the air handler to the air handler diffuser. The inventive air handling system further includes an air recirculation system which has a blower for drawing air from the specialized environment for recirculation; a recirculation diffuser operatively connected to the specialized environment for recirculating air back to the specialized environment by action of the blower; and recirculation ductwork providing a pathway for air traveling from the blower to the recirculation diffuser, wherein the air recirculation system is independent from the facility air handling system.

The air recirculation system can also have a recirculation air return register through which air is provided from the specialized environment to the recirculation ductwork, a heater for raising the temperature of air traveling to the recirculation diffuser, and/or cooling coils for conditioning the air traveling to the recirculation diffuser. A filter for filtering the air recirculated back to the specialized environment can also be included, which preferably is disposed on the recirculation diffuser such that air being recirculated back to the specialized environment via the recirculation diffuser is filtered immediately prior to being recirculated back to the specialized environment. Such a filter can also be provided on the air handler diffuser. Moreover, either or both of the recirculation diffuser and the air handler diffuser can also include an auxiliary blower to facilitate the provision of air to the specialized environment.

Most preferably, the air recirculation system can have a source of ultraviolet light for removing condensate from the cooling coils and there immediate area, disinfecting the cooling coils and disinfecting the airstream itself. The source of ultraviolet light is advantageously arrayed such that the cooling coils are disposed between the source of ultraviolet light and the internal portion of the specialized environment. A reflector can also be disposed such that the source of ultraviolet light is disposed between the reflector and the cooling coils. A drain pan can be arrayed such that the drain pan collects condensation dripping off the cooling coils.

It is to be understood that both the foregoing general description and the following detailed description present embodiments of the invention, and are intended to provide an overview or framework of understanding the nature and character of the invention as it is claimed. The accompanying drawings are included to provide a further understanding of the invention and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
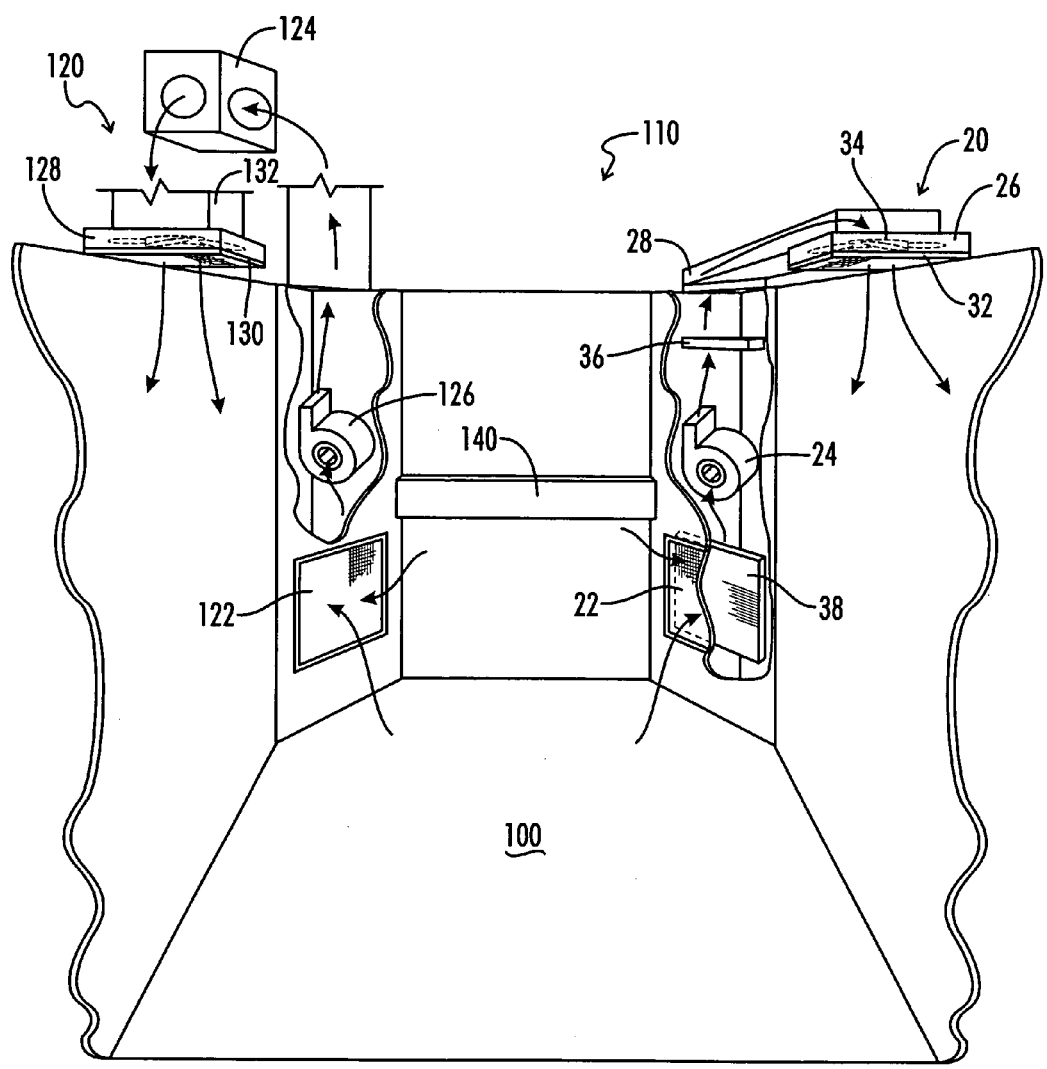
FIG. 1 is a partially broken away perspective view of a specialized environment in which the inventive air handling system is disposed in accordance with the invention.

Embodiments of the present invention will now be described in greater detail with respect to the aforementioned drawings. Like or similar reference numerals will be used whenever possible. The air handling system of the present invention will be described in terms of inclusion in an operating room in a hospital; such is for convenience only. It will be understood that the inventive air handling system can be applied to an operating room in another type of health care facility or in any other specialized environment in which increased air recirculation needs are present, and differ from the air recirculation needs of other rooms or environments within the same facility. Likewise, the invention will be described with respect to a specific orientation and relationship of elements with respect to each other, but it will be recognized by the skilled artisan that other orientations and relationships will be equally applicable.

Figure 4:
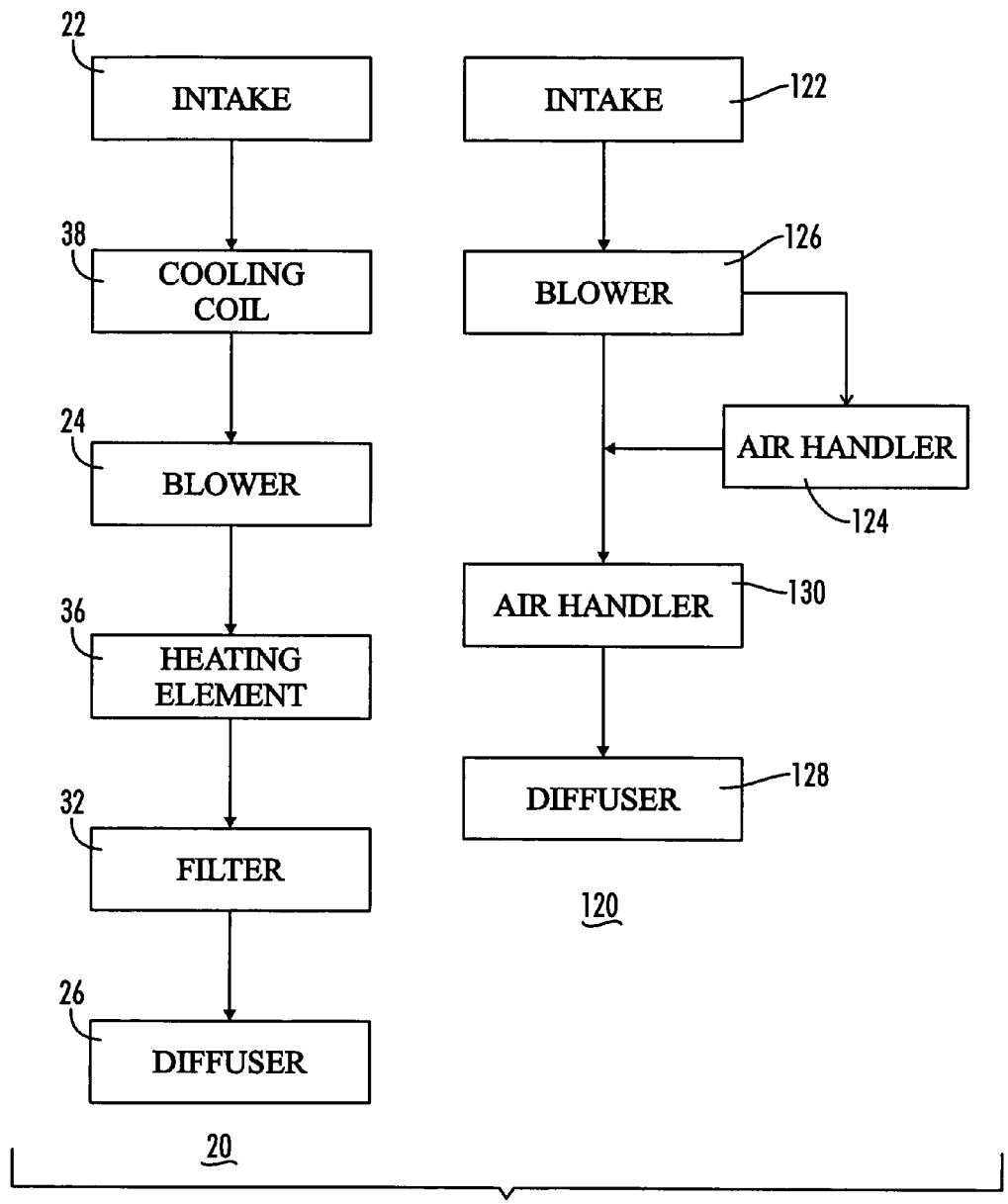
FIG. 4 is a pair of schematic flow charts illustrating the elements of the inventive air handling system.

In a preferred embodiment, illustrated in FIGS. 1 and 4, the present invention relates to an air handling system 110 for a specialized environment, such as an operating room 100, which comprises an independent air recirculation system 20 capable of increasing the air recirculation in the operating room 100 as compared to other environments within the same facility. By independent is meant that air recirculation system 20 is independent from, that is, does not share common ductwork with, the primary air handling system 110 of the facility itself.

As shown in FIGS. 1 and 4, air recirculation system 20 comprises a recirculation return air register 22 and a recirculation blower 24 along with recirculation diffuser 26 and the appropriate ductwork 28 between recirculation return air register 22, recirculation blower 24 and recirculation diffuser 26 for circulating air from the specialized environment. In so doing, air is drawn through recirculation register 22 along ductwork 28 and returned to the specialized environment through recirculation diffuser 26, by the action of recirculation blower 24. In this manner, air recirculation in a specialized environment such as operating room 100 can be increased vis-a-vis other environments in the same facility without an increase in the load on air handling system 110 of the facility itself.

Preferably, air recirculation system 20 comprises apparatus for treating the air being recirculated thereby. For instance, air recirculation system 20 preferably comprises a filter 32 for filtering out bacteria, particulates, or other contaminants in the air being recirculated, in order to maintain the air in the specialized environment at a desired level of purity. It will be recognized that this is especially important in operating room 100 or other like room in a hospital or other health care facility. For greatest efficiency, filter 32 is disposed in relation to recirculation diffuser 26 such that the air being recirculated by air recirculation system 20 is filtered immediately prior to being supplied back to the specialized environment, in order to maximize the effect of filtering, as illustrated in FIG. 1. Recirculation diffuser 26, which is most commonly disposed in the ceiling of the specialized environment, can also comprise an auxiliary blower 34 (such as a fan) for assisting in the diffusing of recirculated air back into the specialized environment.

In addition to filter 32, air recirculation system 20 can also include a heater 36 for adjusting the temperature of the air being recirculated by air recirculation system 20 and/or a cooling coil 38 for cooling and/or conditioning the air being recirculated.

Although FIGS. 1 and 4 illustrate an orientation of air recirculation system 20 whereby cooling coil 38 is disposed adjacent recirculation return air register 22 and heater 36 is disposed after recirculation blower 24, in practice, any particular arrangement or relationship of these individual elements can be used depending on the desires of the practitioner. Most preferably, however, recirculation blower 24, heater 36 and cooling coil 38 are provided in a modular unit that can be moved or replaced for maintenance, repair or a re-allocation of environments in a facility. For instance, a modular unit such as a fan coil system produced by Williams Furnace Company of Colton, Calif., which includes blower, heater and cooling coil, can be employed and consist of those elements of air recirculation system 20 in a modular system.

As illustrated in FIG. 1, the recirculation return air register 22, recirculation blower 24, heater 36 and cooling coil 38 are preferably arrayed in a corner of the specialized environment for which increased recirculation needs are present, whether or not recirculation blower 24, heater 36 and cooling coil 38 are present in a modular unit as described above, or not. Indeed, since ductwork for the facility air handling system 110 is normally arrayed in a corner of an operating room 100 or like specialized environment, the elements of air recirculation system 20 can replace such ductwork. Moreover, it is anticipated that in many applications, air recirculation system 20 will occupy less space than the ductwork that would be necessary if air handling system 110 of the facility was needed to provide the high air recirculation needs of the specialized environment. Thus, air recirculation system 20, when used in a corner of the specialized environment, will occupy less space than the ductwork conventionally used; indeed, as little as seventy percent (70%) of the conventional space requirements. In an operating room 100 for instance, this space savings is significant since space in such environments is at a premium.

As illustrated in FIGS. 1 and 4, air handling system 110 further comprises, in another embodiment, a facility air handling system 120 including a return air register 122, which draws air from the specialized environment and recirculates a portion of the air back to the specialized environment and returns the remainder of the air to the air handler 124 of facility air handling system 120 via the use of blower 126. Air handler 124 exhausts return air from the specialized environment to the outside and draws outside air in, and provides conditioned outside air back to the specialized environment, where it mixes with the recirculated air in a mixing chamber (not shown) and thereafter is exhausted into the specialized environment via a ceiling diffuser 128. Most preferably, the air returned to the specialized environment via facility air handling system 120 is also filtered to reduce bacteria particulates and other contaminants. Advantageously, the air is filtered through the use of a filter 130 disposed in association with diffuser 128 through which air is returned to the specialized environment from air handler 124 through ductwork 132.

Because of the presence of air recirculation system 20, facility air handling system 120 need only supply the amount of air to the specialized environment as it does to every other room or environment in the facility, such that the load on air handling system 120 need be no greater than if the specialized environment(s) was not present in the facility. As such, the presence of air recirculation system 20 is extremely advantageous in eliminating the need for an over-sized or larger air handler 124 and ductwork 132 because of the presence of specialized environments such as operating room 100, requiring additional air recirculation, at substantial increase in efficiency and significant cost savings.

In addition, because the required ductwork 132 for returning air to air handler 124 from return register 122 is less than it would be if ductwork 132 were needed for the increased air recirculation demands of an operating room 100 or other like specialized environment, the space ordinarily devoted to such ductwork can be used for other purposes such as a shelf for equipment storage, an x-ray viewer, a television or computer screen to provide video or information for room occupants or user (not shown). In addition, the space can be used to medical gas or vacuum systems normally provided through the medical rail 140 of an operating room 100 or other like specialized environment in a hospital or other health care facility. Again, given the premium placed on space in such a specialized environment, the space savings provided by use of an air handling system 110 of the present invention is extremely advantageous.

Figure 2:
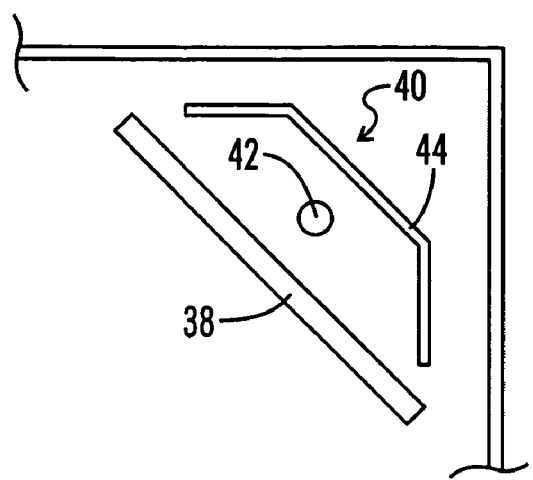
FIG. 2 is a top plan view of another embodiment of the specialized air handling system of the present invention.
Figure 3:
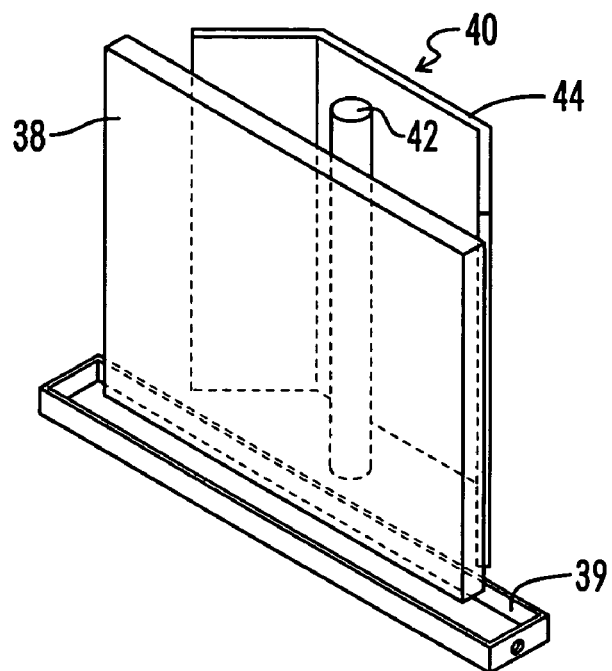
FIG. 3 is a perspective view of the embodiment of FIG. 3, showing certain of the elements in phantom.

In another embodiment, illustrated in FIGS. 2 and 3, a system 40 for reducing condensate build-up and the bacteria content in air recirculation system 20 can be employed. System 40 comprises an ultraviolet lamp 42 disposed in relation to cooling coil 38 such that cooling coil 38 is exposed to ultraviolet light. The ultraviolet light produced can help to sterilize the cooling coil 38 and the air-stream environment (especially at 254 nm) and, in addition, the heat generated can help to remove condensate accumulated on cooling coil 38. Indeed, where a drain pan 39 is arrayed below cooling coil 38, the ultraviolet light can kill any bacteria that may grow in the liquid in drain pan 39 and may also vaporize condensate that collects in the drain pan.

In order to increase the effectiveness of ultraviolet lamp 42, a reflector 44 can be disposed such that the ultraviolet lamp 42 is between reflector 44 and cooling coil 38 such that reflector 44 reflects the ultraviolet light towards cooling coil 38 to maximize the amount of ultraviolet light to which cooling coil 38 is exposed. In this way, cooling coil 38 is disinfected via the ultraviolet light thus assisting in maintaining the purity of air recirculated by air recirculation system 20. Moreover, removal of the condensate by the ultraviolet light will also assist in humidity control for the recycled air.

The use of ultraviolet lamp 42 can have many practical advantages. For instance, the ultraviolet light generated by ultraviolet lamp 42 can reduce energy costs, by reducing the obstructions that would otherwise build up on cooling coil 38. Moreover, the reduction in obstructions can also reduce maintenance schedules and the effort needed to maintain cooling coil 38 operating efficiently.

All cited patents and publications referred to in this application are incorporated by reference.

The invention thus being described, it will be apparent that it may be varied in many ways. Such variations are not to be regarded as a departure from the spirit and scope of the present invention and all such modifications as would be apparent to one skilled in the art are intended to be included within the scope of the following claims.

What is claimed is:

1. An air handling system for a specialized environment in a facility, the air handling system comprising:
   (a) a facility air handling system which comprises
      (i) an air handler connected to the outside air for exhausting return air from the specialized environment and for drawing outside air into the specialized environment;
      (ii) an air handler diffuser operatively connected to the specialized environment for providing air from the air handler to the specialized environment;
      (iii) an air return register through which air is provided from the specialized environment to the air handler;
      (iv) a first set of air handler ductwork for providing a pathway for air traveling from the specialized environment to the air handler; and
      (v) a second set of air handler ductwork for providing a pathway for air traveling from the air handler to the air handler diffuser;

(b) an air recirculation system which comprises
   (i) a blower for drawing air from the specialized environment for recirculation;
   (ii) a recirculation diffuser operatively connected to the specialized environment for recirculating air back to the specialized environment by action of the blower; and
   (iii) recirculation ductwork providing a pathway for air traveling from the blower to the recirculation diffuser, wherein the air recirculation system is permanently isolated from the outside air and is independent from the facility air handling system so that all air drawn from the specialized environment by the blower is returned to the specialized environment;
   wherein said air recirculation system includes a first corner ductwork located in a first corner of the specialized environment and extending from floor to ceiling; and
   wherein said first set of air handler ductwork of said facility air handling system includes a second corner ductwork located in a second corner of the specialized environment and extending from floor to ceiling, said first and second corners being located at a common end of said specialized environment.

2. The system of claim 1 wherein the air recirculation system further comprises a recirculation air return register through which air is provided from the specialized environment to the recirculation ductwork.

3. The system of claim 1 wherein the air recirculation system further comprises a heater for raising the temperature of air traveling to the recirculation diffuser.

4. The system of claim 1 wherein the air recirculation system further comprises cooling coils for conditioning the air traveling to the recirculation diffuser.

5. The system of claim 1 wherein the air recirculation system further comprises a filter for filtering the air recirculated back to the specialized environment.

6. The system of claim 5 wherein the filter is disposed on the recirculation diffuser such that air being recirculated back to the specialized environment via the recirculation diffuser is filtered immediately prior to being recirculated back to the specialized environment.

7. The system of claim 1 wherein the recirculation diffuser further comprises an auxiliary blower to facilitate recirculation of air to the specialized environment.

8. The system of claim 4 which further comprises a source of ultraviolet light for disinfecting the cooling coils.

9. The system of claim 8 wherein the source of ultraviolet light is arrayed such that the cooling coils are disposed between the source of ultraviolet light and the internal portion of the specialized environment.

10. The system of claim 8 which further comprises a reflector disposed such that the source of ultraviolet light is disposed between the reflector and the cooling coils.

11. The system of claim 4 which further comprises a drain pan arrayed such that the drain pan collects condensation dripping off the cooling coils.

12. The system of claim 1 wherein the facility air handling system further comprises a filter for filtering the air provided to the specialized environment.

13. The system of claim 12 wherein the filter is disposed on the air handler diffuser such that air being provided to the specialized environment via the air handler diffuser is filtered immediately prior to being provided to the specialized environment.

14. The system of claim 13 wherein the air handler diffuser further comprises an auxiliary blower to facilitate providing air to the specialized environment.

* * * * *